(12) United States Patent
Wengert et al.

(10) Patent No.: US 8,262,346 B2
(45) Date of Patent: Sep. 11, 2012

(54) CONTROL RING FOR VARIABLE TURBINE GEOMETRY

(75) Inventors: Andreas Wengert, Auenwald (DE); Markus Eble, Stuttgart (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 711 days.

(21) Appl. No.: 12/366,123

(22) Filed: Feb. 5, 2009

(65) Prior Publication Data

US 2009/0252601 A1 Oct. 8, 2009

(30) Foreign Application Priority Data

Feb. 6, 2008 (DE) .................. 10 2008 007 670

(51) Int. Cl.
*F01D 17/12* (2006.01)
(52) U.S. Cl. .................................................... 415/163
(58) Field of Classification Search .............. 415/148, 415/150, 159–166; 403/1, 348–353
See application file for complete search history.

(56) References Cited

U.S. PATENT DOCUMENTS

| | | | | |
|---|---|---|---|---|
| 4,145,875 A | * | 3/1979 | Liddle et al. | 60/773 |
| 4,300,869 A | * | 11/1981 | Swearingen | 415/160 |
| 4,726,744 A | * | 2/1988 | Arnold | 417/407 |
| 5,314,301 A | * | 5/1994 | Knight | 415/160 |
| 6,779,971 B2 | * | 8/2004 | Garrett | 415/156 |
| 2006/0112690 A1 | * | 6/2006 | Hemer | 60/602 |
| 2008/0031728 A1 | * | 2/2008 | Sausse et al. | 415/160 |
| 2008/0240906 A1 | * | 10/2008 | Barthelet et al. | 415/148 |
| 2009/0016875 A1 | * | 1/2009 | Noelle | 415/148 |

FOREIGN PATENT DOCUMENTS

JP 2003-254075 * 9/2003

* cited by examiner

*Primary Examiner* — Steven Loke
*Assistant Examiner* — Victoria K Hall
(74) *Attorney, Agent, or Firm* — Rader, Fishman & Grauer PLLC

(57) ABSTRACT

The invention relates to a variable turbine geometry (12) of a supercharging device, in particular an exhaust gas turbocharger for an internal combustion engine. The variable turbine geometry (12) comprises guide vanes (30) that are assigned to the circumference of a turbine rotor and are operated by means of a control ring (22) that is accommodated on journals (16) of the guide vanes (30). The control ring (22) is locked on these supporting journals (16) of the guide vanes (30).

20 Claims, 7 Drawing Sheets

CONTROL RING FOR VARIABLE TURBINE GEOMETRY

CROSS-REFERENCES TO RELATED APPLICATION

This application is claims priority to German Patent Application DE 102008007670.8, filed Feb. 6, 2008, of which is hereby incorporated by reference in its entirety.

STATE OF THE ART

U.S. Pat. No. 4,726,744 relates to an exhaust gas turbocharger with variable turbine geometry (VTG). The exhaust gas turbocharger comprises a turbine part and a compressor part. The turbine rotor and the compressor rotor are mounted on the same shaft. A variable turbine geometry with a number of guide vanes is assigned to the circumference of the turbine rotor. The guide vanes have a wing profile and a journal extending from the wing profile. In addition, the guide vanes comprise a section of the operating arm, which extends transversely from the journal and on which in turn a pin is formed. The guide vanes are arranged around the circumference of the turbine rotor, where they are spaced a distance apart from one another in the circumferential direction. The pins for operating the guide vane journals and therefore the guide vanes themselves protrude into slots formed in a shared control ring. The guide vane journals also rotate with rotation of the control ring. The control ring by which all the guide vanes of the variable turbine geometry are operated jointly is supported by at least some of the guide vane journals and can be operated in the circumferential direction by a drive.

With the control ring known from U.S. Pat. No. 4,726,744 for operation of the guide vanes, their journals are designed in a relatively complex manner to allow secure operation by the joint control ring.

DISCLOSURE OF THE INVENTION

It is proposed according to the invention that the control ring for operation of the guide vanes of a variable turbine geometry (VTG) should be mounted and locked on a number of journals of the guide vanes. The lock is preferably embodied as a bayonet closure. To implement this bayonet closure, the journals of the guide vanes have a groove on the ends facing away from the guide vanes. This groove serves to receive the control ring, which is applied to the supporting journals of the guide vanes in the axial direction and then is locked on the supporting journals in the circumferential direction.

Instead of grooves, which are created in the ends of the journals facing away from the guide vanes, it is also possible to apply rollers or bushings, which allow axial and radial guidance of the control ring, to the journals of the guide vanes.

In a first embodiment, radial slots running radially from the inside circumference of the control ring may be implemented. On the inside circumference of the control ring, guide areas are formed between the radial slots in the first embodiment. With these guide areas, the supporting ring in its first embodiment is supported on the journals of the guide vanes that have circumferential grooves or rollers. After mounting of the control ring in a mounting position, said mounting taking place in the axial direction and after a rotational movement in the circumferential direction, the control ring is supported and locked on the supporting journals of the guide vanes of a guide vane bearing ring of the supercharging device. The control ring may be supported and guided either on all the journals of the guide vanes of the variable turbine geometry or on only a few supporting journals of the guide vanes of the variable turbine geometry. A division of functions is also conceivable, one portion of the journals of the guide vanes together with the circumferential groove serving to provide axial guidance, another portion of the journals that are designed with journals without circumferential grooves serving to provide radial guidance for the control belt. The portion of the journals without a circumferential groove serving to provide radial guidance for the control ring could also have journal ends on which rollers are rotatably accommodated.

In another embodiment of the control ring for joint operation of the guide vanes of the variable turbine geometry assigned to the circumference of a turbine rotor of the turbine part, the control ring is embodied with a reduced inside diameter and is provided with a number of L-shaped openings. Starting from a mounting opening, the L-shaped openings have a radial part and a circumferential part. The mounting opening serves to join the control ring to the individual journal ends of the journals of the guide vanes of the VTG. First guide areas and second guide areas, within which the control ring is guided on the bearing journals, are formed by the circumferential parts of the L-shaped openings.

In a modification of the present embodiment variant, the openings configured in an L-shape in the control ring may also have a circumferential part that is designed to be enlarged (widened). Consequently, in this embodiment variant, the radial part of the L-shaped openings is no longer in contact at both ends but instead only at one end, forming a single guide area, within the groove and/or the roller of the bearing journal of the guide vanes of the VTG.

In additional advantageous embodiments of the approach proposed according to the present invention, the control ring may also be manufactured without radial slots. The grooves on the outside circumference of the control ring for receiving the control journal of the control lever may have not only an inclined orientation but also a radially directed orientation. Individual cutouts, which serve as mounting openings, may be provided on the inside circumference of the control ring, guide areas and supporting areas being embodied between these mounting openings and extending in the circumferential direction. Finally, instead of using the above-mentioned L-shaped openings in the material of the control ring which have a radial part and a circumferential part, there is the possibility of omitting the radial part in order to form openings in the form of a keyhole extending in the circumferential direction. This design variant may also be modified to the extent that these openings extending in the circumferential direction have a widened area in which a guide area is designed on only one side.

The control ring proposed according to the invention, supported on a number of journals of the guide vanes or on all the journals of the guide vanes with guide areas on the inside circumference and/or on guide areas on the circumferential parts of L-shaped openings or in openings running in the shape of a keyhole in the circumferential direction, has grooves running obliquely, radially or in a curve on its outside circumference. In mounting of the control ring on the guide vane bearing ring, control journals of control levers engage in these grooves. With rotation of the control ring, the control journals are moved by the grooves running obliquely, radially or in a curve on the outside circumference thereof. The control journals in turn operate control levers, which are accommodated on a polygon on the journal of the guide vanes and rotate the guide vanes in the circumferential direction with respect to the guide vane bearing ring. Any geometry that allows a form-fitting connection for the rotationally fixed accommodation of the control lever may be provided on the journals. The approach proposed according to the present invention achieves the result that the tolerance chain with respect to manufacturing precision is reduced and the control ring can be supported on the guide vane bearing ring of the VTG without any additional components. Owing to the more accurate and narrower tolerance chain, the hysteresis, i.e., the free travel or clearance which is established is greatly reduced in the control of the variable turbine geometries, resulting in a more rapid response of the turbine part with the VTG proposed according to the invention. Due to the locking of the control ring for joint operation of the guide vanes of the VTG, designed as a bayonet closure, this yields a closed module that can be handed and installed as a compact component.

BRIEF DESCRIPTION OF THE DRAWINGS

On the basis of the drawings, the invention is described in greater detail below.

EMBODIMENTS

Figure 1:
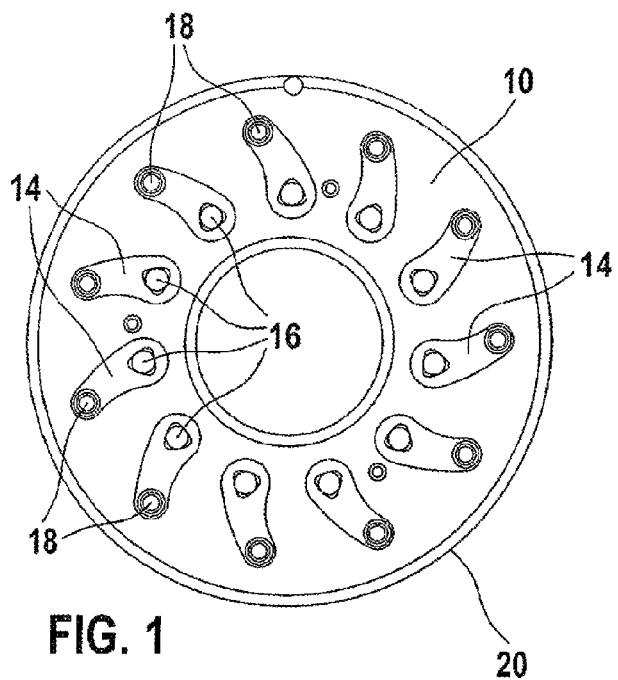
FIG. 1 shows a view of the vane bearing ring.

FIG. 1 shows a top view of a vane bearing ring of a variable turbine geometry of the turbine part of a supercharging device.

FIG. 1 shows that a vane bearing ring 10 of a variable turbine geometry 12 (VTG) has a plurality of control levers 14. The guide vanes of the VTG 12 assigned individually to the circumference of a turbine rotor are arranged on the side behind the vane bearing ring 10 and for this reason are not visible in FIG. 1. The control levers 14 are each rotatable about the axes of the guide vane journals 16. A guide vane 30 having a profile in the shape of a hydrofoil is assigned to each of the guide vane journals 16 on the side covered by the vane bearing ring 10. A control journal 18, which is movable in the circumferential direction by a control ring 22 (cf FIG. 3, for example) is situated on each control lever 14. The circumference of the vane bearing ring 10 according to the diagram in FIG. 1 is labeled with reference numeral 20.

Figure 2:
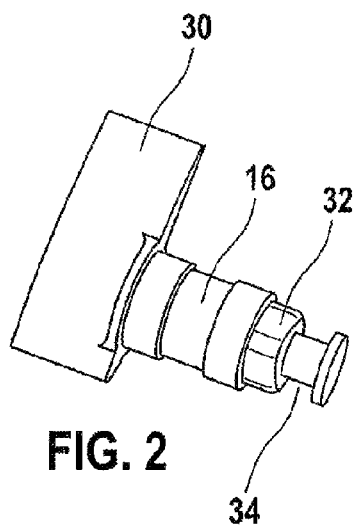
FIG. 2 shows a perspective reproduction of a guide vane together with journals.

FIG. 2 shows a guide vane of the VTG.

The schematic diagram according to FIG. 2 shows that a guide vane 30 is accommodated on a guide vane journal 16. The guide vane journal 16 comprises a polygon 32 which may be a square, a hexagon or some other geometry that allows a form-fitting connection. The control lever 14 is accommodated in the area of the polygon 32; the guide vane journal 16 operating the guide vane 30 can be operated in the direction of rotation by this control lever. The perspective view according to FIG. 2 also shows that a circumferential groove 34 is accommodated in the guide vane journal 16 on the end of the guide vane journal 16, said journal representing a guide area and/or supporting area for the control ring 22, which operates a plurality of guide vanes 30 of the variable turbine geometry 12 jointly. Axial and radial guidance of the control ring 22 (cf. diagram according to FIG. 3) is ensured by the circumferential groove 34 on the end of the guide vane journal 16.

Figure 3:
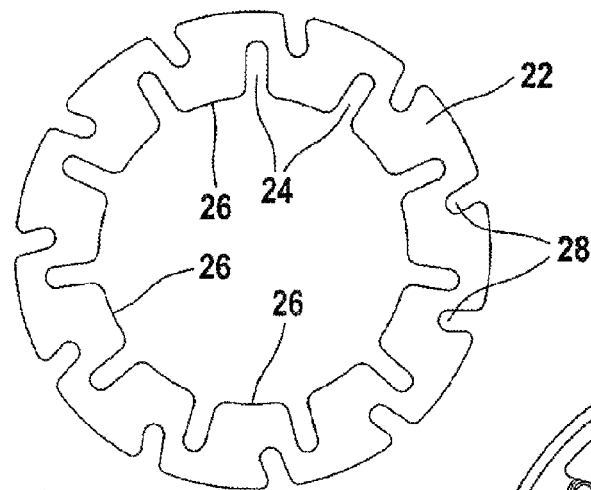
FIG. 3 shows a top view of a first embodiment of the control ring.

FIG. 3 shows a first embodiment of the control space proposed according to the invention in a view from above.

As shown in the view from above according to FIG. 3, the control ring 22 in the first embodiment comprises a plurality of radial openings 24 proceeding from the inside circumference. The radial openings 24 are preferably manufactured with rounded edges and have openings facing the inside circumference of the control ring 22. There are also at least one opening/groove 28 on the outside circumference of the control ring 22 in a radial, inclined or curved orientation, receiving the control journals 18 mounted on the control levers 14 shown in FIG. 1. With rotation of the control ring 22 mounted on some or all of the guide vane journals 16 in the circumferential direction, there is also rotation of the control levers 14 designed to be curved or straight, and consequently there is a movement of the guide vanes 30 of the variable turbine geometry 12 as an adjusting movement with respect to the circumference of a turbine rotor blade of the turbine part of the supercharging device.

Figure 5:
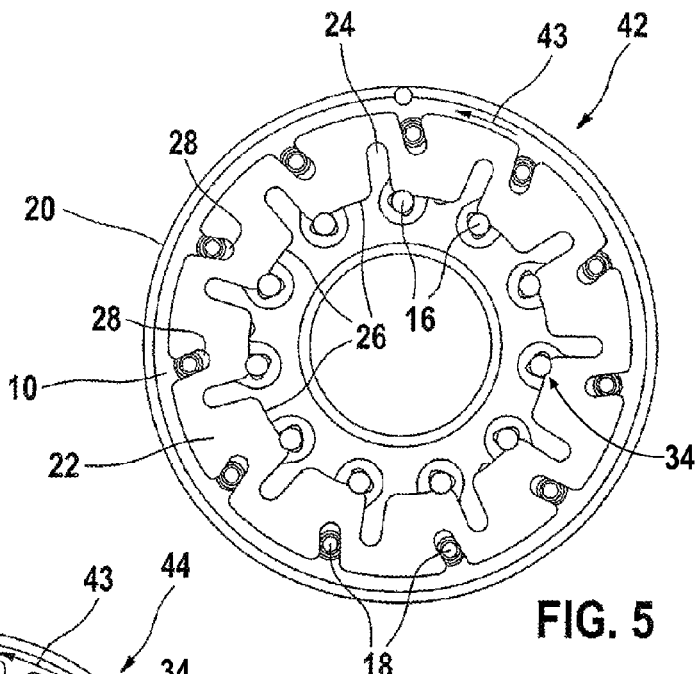
FIG. 5 shows a first operating position of the control ring accommodated on the vane bearing ring.
Figure 6:
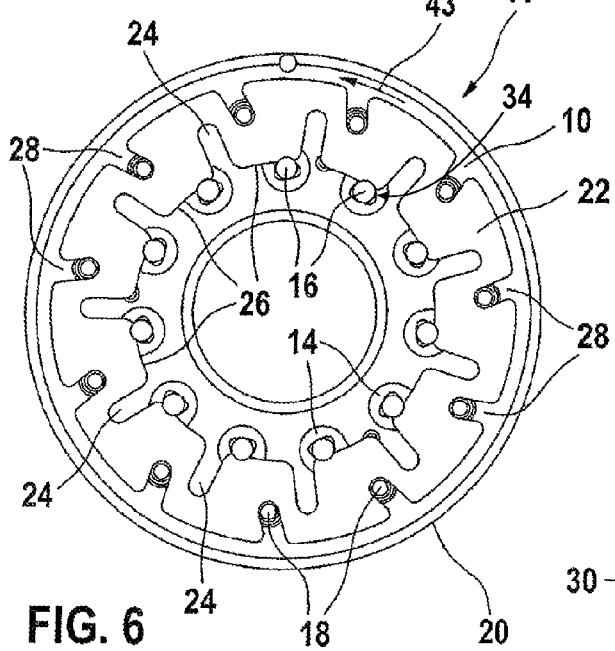
FIG. 6 shows another operating position of the control ring.

The inside circumference into which the individual radial openings 24 open represents a guide/support area 26 of the control ring 22 on the journal ends of the guide vane journals 16 (cf. FIGS. 5 and 6 in particular).

Figure 4:
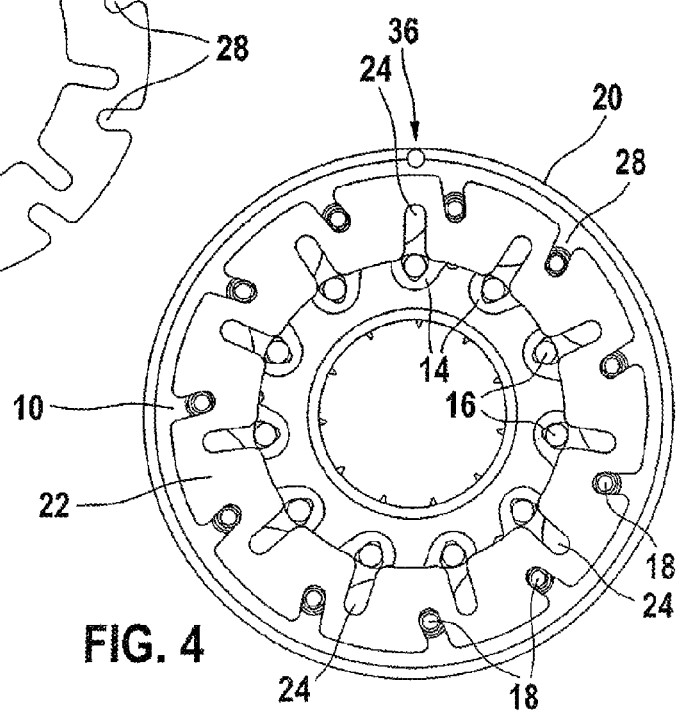
FIG. 4 shows the installation position of the control ring according to FIG. 3 and the vane bearing ring according to FIG. 1.

FIG. 4 shows a mounting position of the control ring according to the first embodiment as shown in FIG. 3 on the vane bearing ring. As FIG. 4 shows, the control ring 22 is mounted axially on the journal ends of the individual guide vane journals 16 according to the embodiment shown in FIG. 3. The ends of the guide vane journals 16 are each aligned with the radial openings 24 situated on the inside circumference of the control ring 22. At the same time, the individual control 35 journals 18 of the control levers 14 are surrounded in the openings/grooves 28 running obliquely, radially or in a curve on the outside circumference of the control ring 22. In the mounting position 36 shown in FIG. 4, the control levers 14 according to the view of the vane bearing ring 10 in FIG. 1 are covered by the control ring 22 according to the embodiment in FIG. 3.

FIG. 5 shows that after mounting of the control ring 22 in the first embodiment according to FIG. 3, it is moved into a first operating position 42 in the adjusting direction 43. The guide/support areas 26 forming the inside circumference of the control ring 22 are inserted into the grooves 34 of the guide vane journals 16. The diagram according to FIG. 5 shows that the control ring 22 according to the first embodiment is accommodated on each of the guide vane journals 16 of the variable turbine geometry 12. As an alternative to that, it is also conceivable for the control ring 22 to be accommodated and supported on every second or every third one of the guide vane journals 16 but not on each and every one.

If the control ring 22 is moved in the adjusting direction 43 from the first operating position 42 shown in FIG. 5 into a second operating position 44 shown in FIG. 6, then the guide/support areas 26 guided by the grooves 34 on the ends of the guide vane journals 16 run in these grooves and produce a joint movement of the control levers 14 about each of the guide vane journals 16 with counterclockwise rotation of the control ring 22. The working range, i.e., the control range of the variable turbine geometry 12, is between the first operating position 42 and the second operating position 44. Due to the adjustment of the variable turbine geometry 12 in both directions within this range, the oncoming flow of the turbine rotor is adapted to the load state.

The rotational movement of the control ring 22 in the adjusting direction 43 can be created by a pneumatic, hydraulic or electric actuator. Since each of the control journals 18 of the control levers 14 is accommodated in the openings/groove 28 oriented obliquely, radially or in a curve, on counterclockwise operation of the control ring 22 in the adjusting direction 43, there is a joint adjustment of all control levers 14 and therefore a joint adjustment of all guide vanes 30 of the variable turbine geometry 12 according to the adjusting direction and the adjusting path impressed upon the control ring 22. This may be accomplished by an electric, pneumatic or hydraulic actuator.

Figure 7:
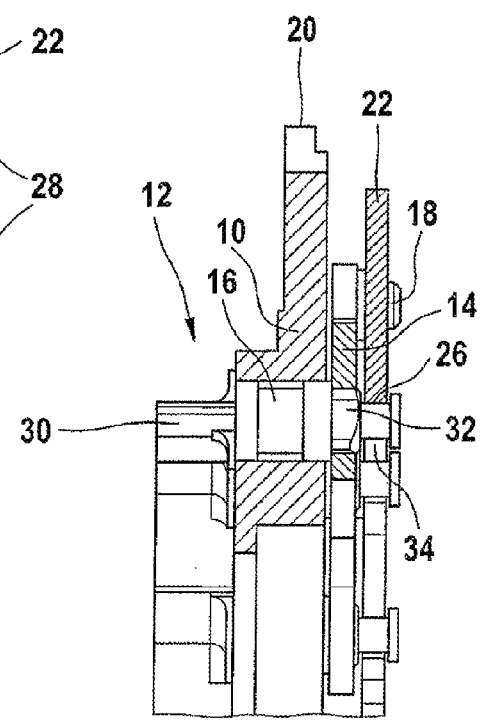
FIG. 7 shows a section through the variable turbine geometry proposed according to the invention.

The diagram according to FIG. 7 shows a partial sectional view through the variable turbine geometry (VTG).

FIG. 7 shows that a guide vane 30 having a wing-shaped profile is accommodated on the back side of the vane bearing ring 10 (concealed in FIG. 1) on each of the guide vane journals 16. The guide vane journal 16 is accommodated in the vane bearing ring 10. The sectional diagram according to FIG. 7 shows that the control lever 14 is accommodated on the polygon 32 of the guide vane journal 16; the control journal 18, which is operated by the control ring 22, is in turn situated on said control lever. The sectional diagram according to FIG. 7 also shows that in this embodiment, the circumferential groove 34 is embodied directly in the material of the guide vane journal 16. As an alternative to the embodiment of the end of the guide vane journal 16 shown in FIG. 7, rollers may also be used in the configuration of pulleys with an L-shaped or U-shaped profiling to support and/or guide the guide areas 26 of the control ring 22 according to the first embodiment thereof illustrated in FIG. 3. In both embodiment variants, i.e., through the design of a circumferential groove 34 on the end of the guide vane journal 16 or by means of rollers mounted there, in which the guide areas 26 on the inside circumference of the control ring 22 are supported, axial and radial guidance of the control ring 22 are guaranteed. It is also conceivable to divide the functions and to provide some of the journals 16 with circumferential grooves 34, in which the control ring 22 is axially guided, and to design the rest of the journals 16 without the circumferential groove and to use it only in the radial guide. This portion of the journals could also be designed with rollers, preferably rollers mounted to rotate. The advantage of the combined arrangement of rollers and axial guidance in the circumferential grooves 34 can be seen in the fact that according to this approach, the rollers can again be held in position by the circumferential grooves 34 by means of the control ring 22, and the control ring 22 may in turn be held in position by the circumferential grooves 34.

Figure 8:
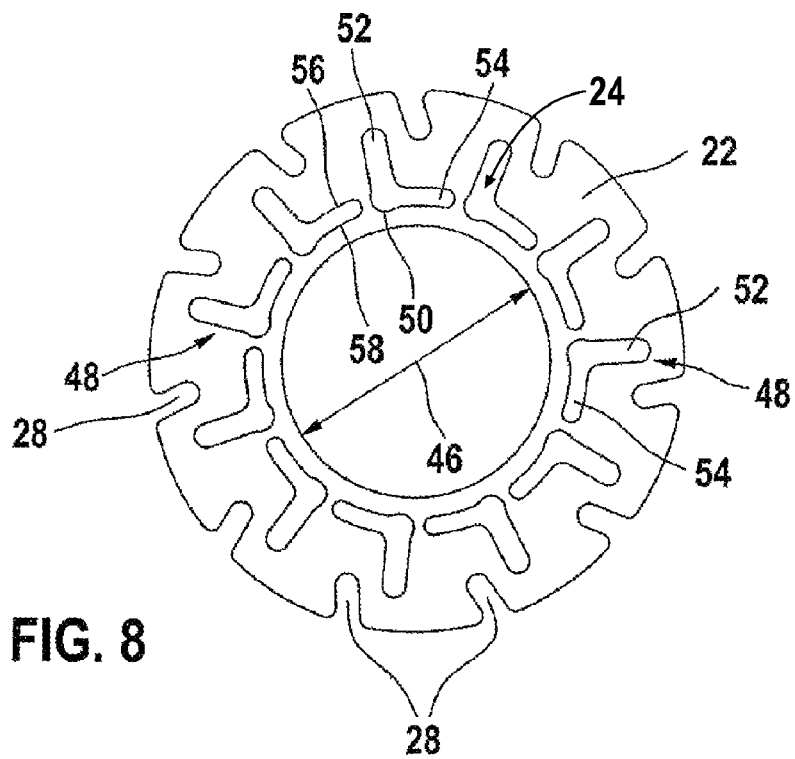
FIG. 8 shows a second embodiment of the control ring proposed according to the invention.

FIG. 8 shows a second embodiment of the control ring.

In contrast with the diagram of the first embodiment of the control ring according to FIG. 3, L-shaped openings 48 are provided in the material of the control ring 22 according to the diagram in FIG. 8. The L-shaped openings 48 comprise essentially a rounded mounting opening 50, a radial part 52 extending in the radial direction of the control ring 22 and a circumferential part 54 extending circumferentially from the mounting opening 50. In contrast with the first embodiment of the control ring 22 in the 30 diagram according to FIG. 3, the control ring 22 illustrated in FIG. 8 is embodied with a reduced diameter 46. The guide/support areas 26 on the inside circumference in the embodiment of the control ring 22 according to FIG. 3 are now formed by the bordering walls of the circumferential parts 54 of the L-shaped openings 48 extending in the circumferential direction. As in the diagram of the control ring 22 according to FIG. 3, a number of inclined openings/grooves 28, which serve the numerous control levers 14 to be operated together with control journals 18, are situated on the outside circumference of the control ring 22 according to FIG. 8.

In the circumferential part 54 of the L-shaped openings 48, a first guide area 56 and/or a second guide area 58 is/are formed. The control ring 22 in the embodiment according to FIG. 8 is guided and/or supported in the circumferential grooves 34 of the guide vane journals 16 or in rollers accommodated on the ends thereof in the circumferential area 54 of the L-shaped openings 48.

Figure 9:
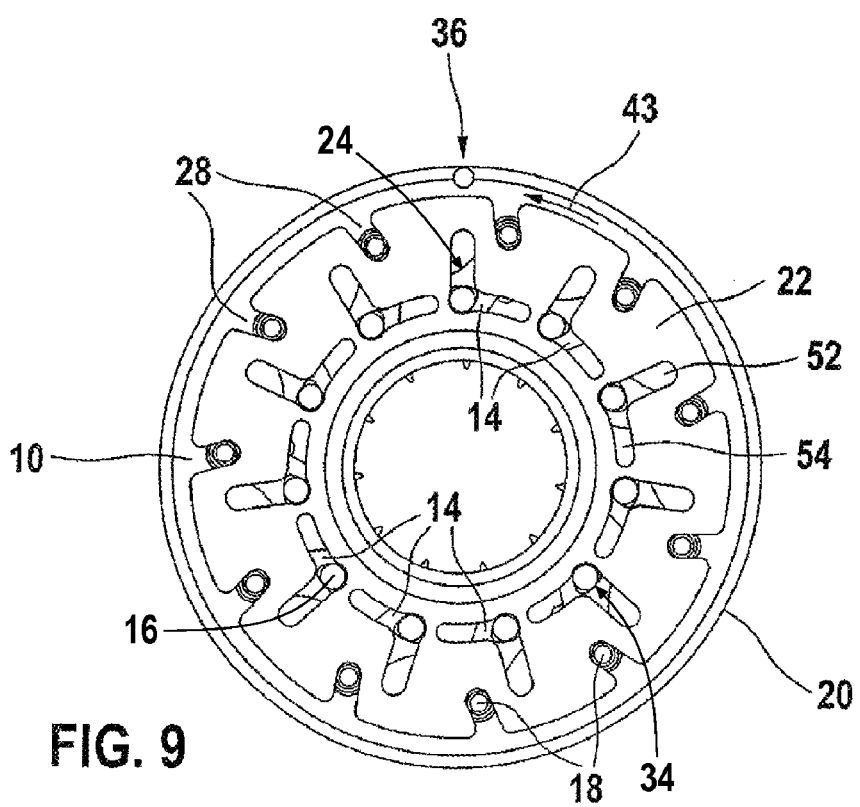
FIG. 9 shows the installation position of the control ring illustrated in FIG. 8.

FIG. 9 shows the mounting position of the control ring according to the diagram in FIG. 8 on the vane bearing ring shown in FIG. 1.

In the second embodiment according to FIG. 8, the control ring 22 is pushed axially onto the ends of the guide vane journals 16, whose mounting openings 50 are continuous. The control journals 18 of the control levers 14 are also inserted into the corresponding openings/grooves 28 running obliquely, radially or in a curve on the outside circumference of the control ring 22.

Figure 10:
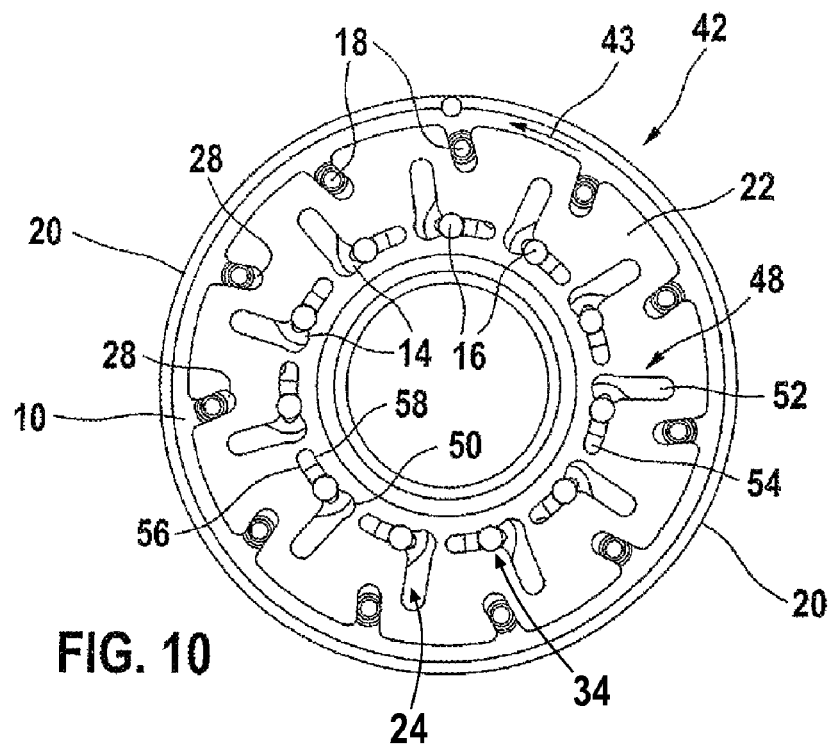
FIG. 10 shows a first operating position of the control ring on the impeller bearing ring illustrated in FIG. 8.

Starting from the mounting position 36 shown in FIG. 9, the control ring 22 is locked on at least one or more or all of the guide vane journals 16 by rotation in the adjusting direction 43, as indicated by the diagram in FIG. 10, into a first operating position 42.

Figure 11:
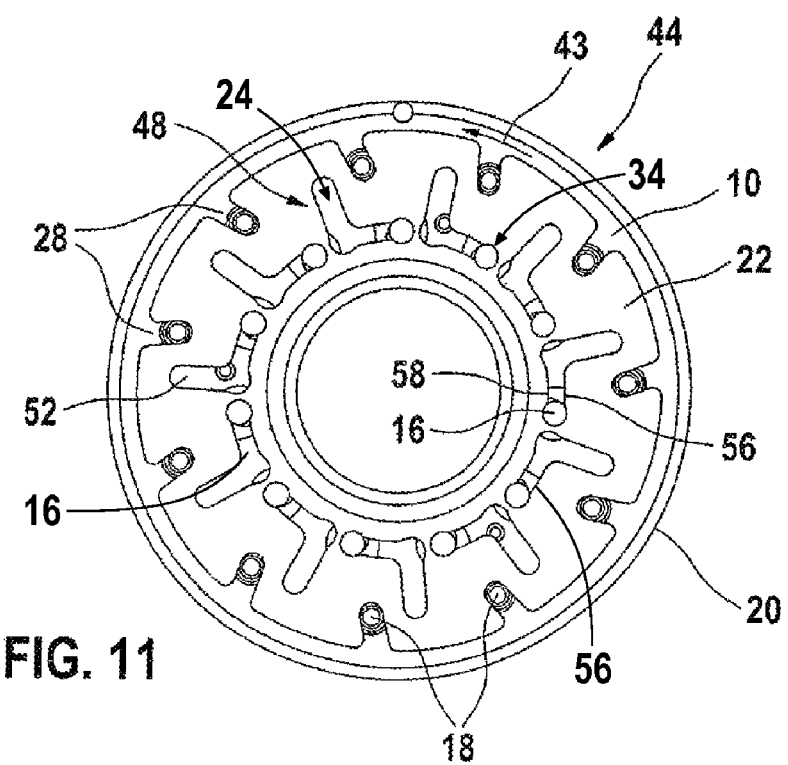
FIG. 11 shows a second operating position of the control ring according to FIG. 8.

As shown by the diagram in FIG. 10, the control ring 22 is guided according to the embodiment in FIG. 8 at both ends of the individual guide vane journals 16, i.e., is guided by the first guide area 56 and by contact with the second guide area 58. If the control ring 22 is adjusted counterclockwise in the adjusting direction 43 from the first operating position 42 shown in FIG. 10 into the second operating position 44 shown in FIG. 11, then the control journals 18 of the control levers 14 are rotated counterclockwise, so the guide vanes 30 arranged on the rear side of the vane bearing ring 10 are rotated. A movement of the control path in the circumferential direction according to the adjusting direction 43—as shown in FIGS. 10 and 11—is represented by the mounting opening 50 and/or the end of the circumferential part 54 of the L-shaped opening extending in the circumferential direction, said end being opposite the mounting opening. The radial openings 24 and the radial parts 52 of the L-shaped openings 48 serve to provide compensation for thermal deformation and the intervention of an actuator for operation of the control ring 22.

Figure 12:
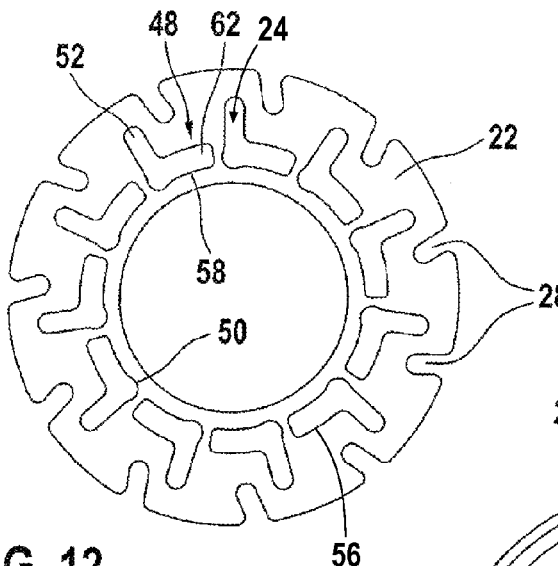
FIG. 12 shows another third embodiment of the control ring.

FIG. 12 shows another third embodiment variant of the control ring proposed according to the present invention.

FIG. 12 shows that the control ring 22 also has L-shaped openings 48 comprising a radial part 52. In deviation from the second embodiment of the control ring 22 shown in FIG. 8, the L-shaped openings 48 of the control ring 22 in the embodiment variant according to FIG. 12 comprise widened circumferential openings 62. Because of the widening of the circumferential openings in the radial direction, only one guide area is established on them, whether it is the interior guide area 58 (second guide area) or the first exterior guide area in the radial direction (cf. item 56). Depending on the widening in the radial direction toward the inside or outside, the control ring 22 is guided on a guide vane journal 16 in only one guide area 56 or 58 of the circumferential part 62 in the third embodiment variant according to FIG. 12.

Figure 13:
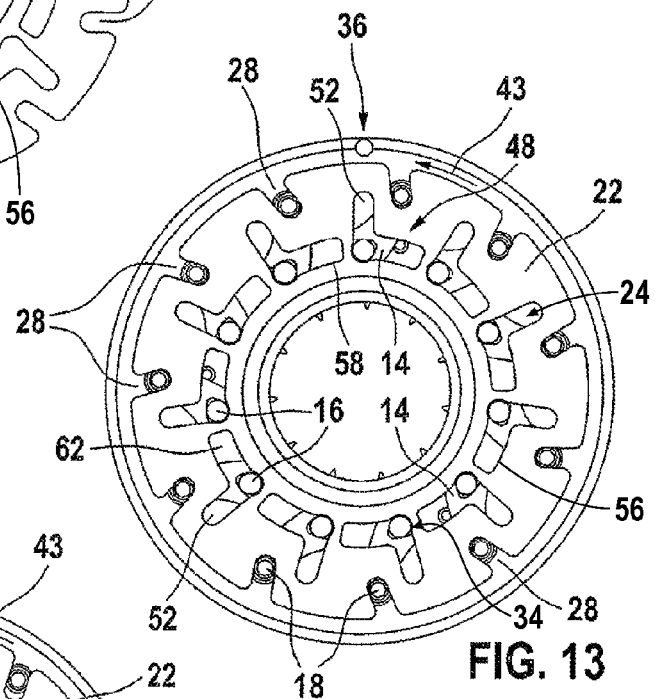
FIG. 13 shows the installation position of the control ring according to the diagram in FIG. 12.

FIG. 13 shows the installation position of the control ring illustrated in FIG. 12 in its third embodiment variant on the vane bearing ring according to FIG. 1.

In the installation position 36, the control ring 22 is positioned relative to the guide vane journals 16 so that the mounting openings 50 of the L-shaped openings 48 in the material of the control ring 22 are aligned with the ends of the guide vane journals 16. Then the control ring 22 is pushed onto the guide vane journals 16 and at the same time care is taken to ensure that the control journals 18 of the control levers 14 engage in the openings/grooves 28 on the outside circumference of the control ring 22. After successful mounting of the control ring 22 on the control journal 16 of the control levers 14, the control ring 22 is rotated counterclockwise according to the adjusting direction 43 as shown in FIG. 14.

Figure 14:
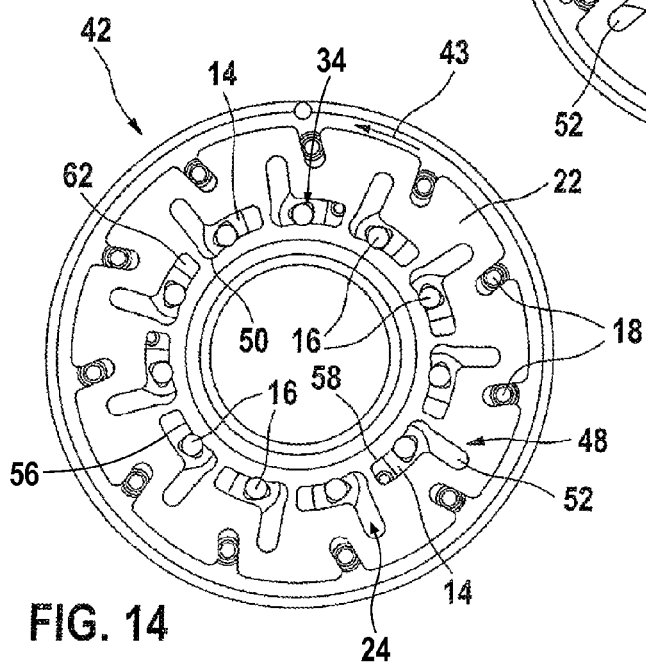
FIG. 14 shows a first operating position of the control ring according FIG. 12.

FIG. 14 shows the control ring 22 shifted counterclockwise onto the guide vane journals 16, which are moved out of the mounting openings 50 of the L-shaped openings 48, so that the control ring 22 according to the diagram in FIG. 2 is guided only with its second guide area 58, which is on the inside into the circumferential grooves 34 of the guide vane journals 16. The control ring 22 guided on the inner guide area 58 in FIG. 14 could just as easily be guided on the outer edge (in the radial direction) of the widened circumferential part 62 of each of the L-shaped openings 48 in the control ring 22.

Figure 15:
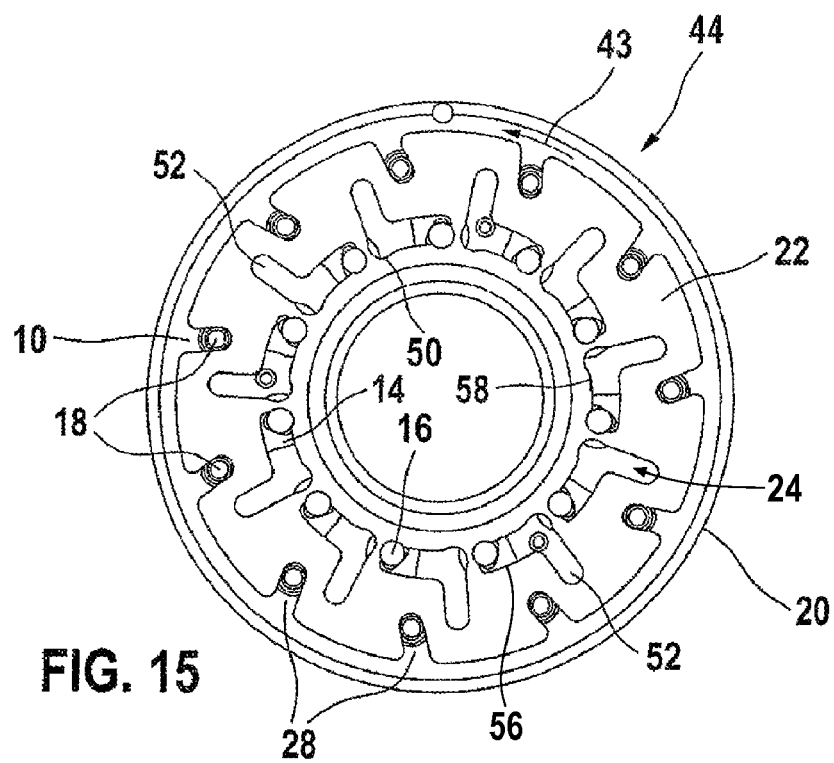
FIG. 15 shows another second operating position of the control ring on the vane bearing ring.

In the diagram according to FIG. 15, the control ring 22 is moved from the first operating position 42 shown in FIG. 14 into the second operating position 44 shown in FIG. 15 according to the third embodiment variant of the control ring as illustrated in FIG. 12. In the second operating position 44, there has been an adjusting movement of the control ring counterclockwise until the guide vane journals 16 were in contact with the borders of the widened circumferential parts 62 of the L-shaped openings 48, said circumferential parts extending in the circumferential direction. In the second operating position 44 shown in FIG. 15, the control ring 22 is also guided on the second guide areas 58, i.e., the surface of the widened circumferential part 62 of the L-shaped openings 48, said surface being on the inside radially.

As an alternative to the guidance of the control ring 22 according to the diagram in FIG. 15, it is also conceivable for the control ring to be guided on the guide area 56 that is on the outside radially, assuming suitably modified widened circumferential parts 62 of the L-shaped openings 48.

Figure 16:
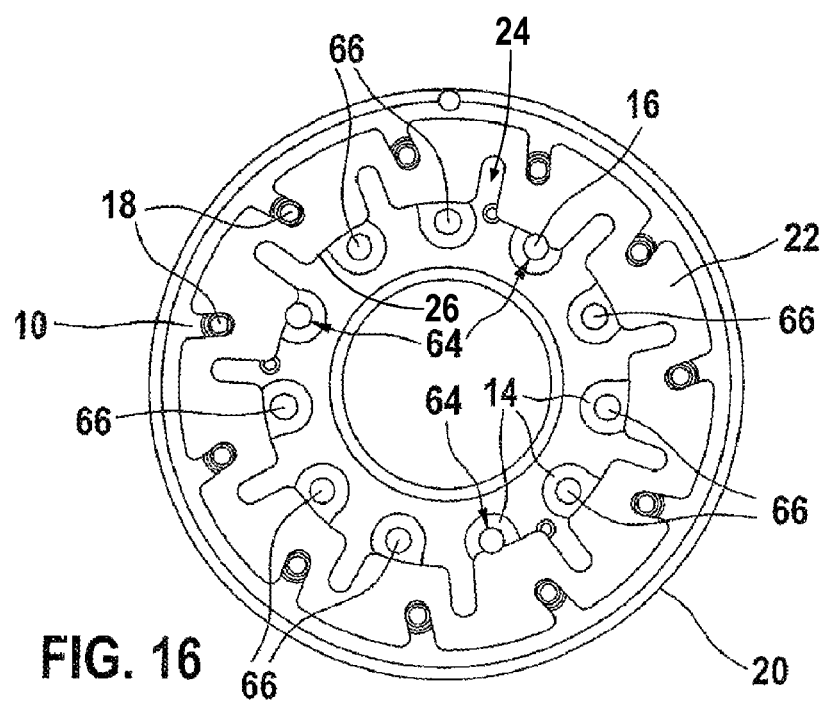
FIG. 16 shows a diagram of a control ring supported on only a few supporting journals in the embodiment according to FIG. 3.

FIG. 16 shows that the control ring illustrated in FIG. 3 with its guide/supporting areas 26 is accommodated only on a few supporting journals 64 of the guide vane journals. The guide vane journals 16, labeled with reference number 66, are not supporting journals. This means that the supporting and guide areas 26 provided on the inside circumference of the control ring 22 do not come in contact with the circumference and/or circumferential grooves 34 on the ends of the guide vane journals 16. However, with the load-bearing guide vane journals 16 labeled with reference numeral 64, the control ring 22 is guided and secured radially and axially by the bayonet closure. This principle may also be applied to the variants presented above.

A shortening of the tolerance chain, i.e., play or clearance, which has a negative effect on the response of a variable turbine geometry, can be prevented by the bayonet closure that is supported and is lockable on some or all of the guide vane journals 16 by the control ring 22, as described in the preceding embodiment variants, with its openings 24 and 48. If guide vanes 30 are manufactured without a circumferential groove 34 in the journals 16, then a control ring 22 which is not supported on all journals 16 may also be embodied.

Instead of circumferential grooves 34, which are cut directly into the guide vane journals 16, rollers with one or two webs (like a pulley) may also be applied to the ends of the guide vane journals 16, in which the guide/supporting sections 26 of the supporting ring 26, for example, are guided and supported according to the embodiment illustrated in FIG. 3. In the case of guide vanes 30, which are manufactured by the MIM method, the circumferential grooves 34 may also be manufactured directly in the guide vane journals 16. The above-mentioned rollers that can be used on the guide vane journals 16 as an alternative may be fixedly or preferably loosely supported on the journal ends of the guide vane journals 16.

Figure 17:
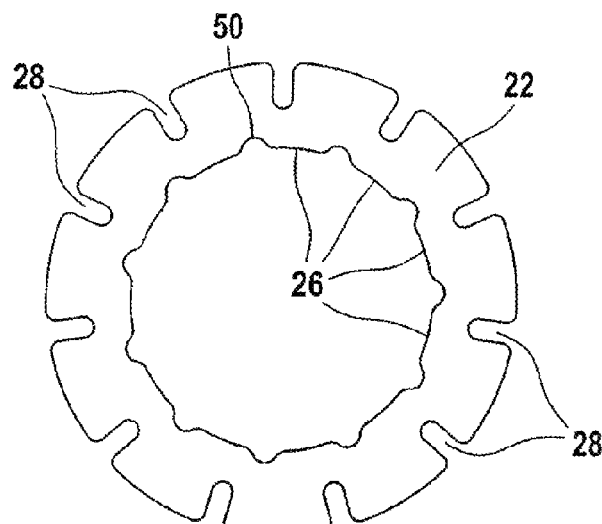
FIG. 17 shows another embodiment of the control ring with grooves running radially on the outside circumference.
Figure 18:
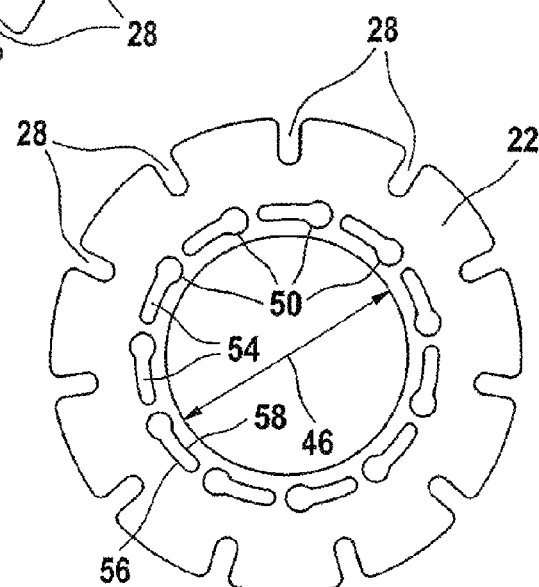
FIG. 18 shows an embodiment of the control ring with openings in the shape of a keyhole extending in the circumferential direction and FIG. 19 shows a modification of the embodiment variant illustrated in FIG. 18 with openings that are widened and extend in the circumferential direction.
Figure 19:
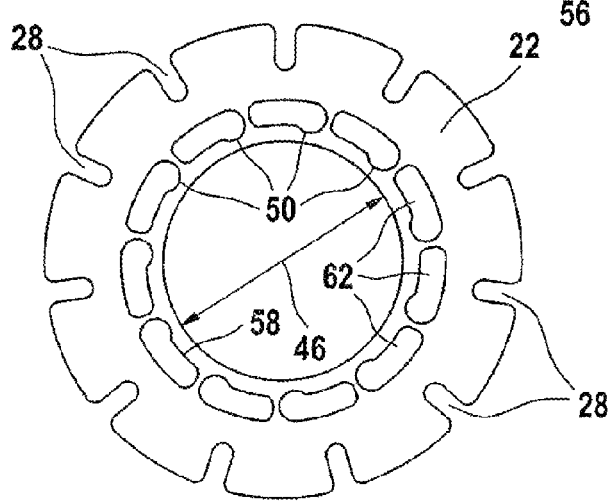

FIGS. 17, 18 and 19 show additional possible embodiments of the control ring 22.

FIG. 17 shows the control ring 22 in which the openings/grooves 28 are designed to run radially on the outside circumference to receive the control journals 18. On the inside circumference of the control ring 22 according to the embodiment variant illustrated in FIG. 17, mounting openings 50 that are rounded in a semicircle are formed, through which guide/supporting areas 26 that are provided on the inside circumference of the control ring 22 are separated from one another. This embodiment illustrated in FIG. 17 resembles the embodiment of the control ring 22 illustrated in FIG. 3 but the radial openings 24 are omitted in the embodiment according to FIG. 17.

FIG. 18 shows an embodiment of the control ring 22 in which openings 54 configured in the form of a keyhole, extending one after the other in the circumferential direction are provided, defining a first guide area 56 on the outside radially and the second guide area 58 on the inside radially. This embodiment, which is shown in FIG. 18, resembles the embodiment of the control ring 22 according to FIG. 8, except that in the embodiment according to FIG. 18, the radial parts 52 extending in the radial direction are omitted. Circumferential parts 54 have mounting openings 50 through which the control ring 22 is installed in the mounting position on the guide vane journals 16 and then is locked in the circumferential direction.

FIG. 19 shows another embodiment of the control ring 22 in which the circumferential openings 54 configured in the form of a key as shown in FIG. 18 are designed—like the widening of the openings extending in the circumferential direction (cf. item 62 in FIG. 12). Due to the widened embodiment of the circumferential opening 62, only one guide area (cf. position 58 in FIG. 19) is shown in contrast with the embodiment according to FIG. 18, in which two guide areas 54, 58 are embodied.

The invention claimed is:

1. A variable turbine geometry supercharging device, comprising:
    a turbine rotor including a circumference;
    a control ring;
    a plurality of guide vanes, each including a guide vane journal configured on the circumference of the turbine rotor, wherein the plurality of guide vanes and guide vane journals are operable by means of the control ring, which is mounted on the guide vane journals, such that the guide vane journals extend through an opening in a surface of the control ring,
    wherein the control ring is supported by and locked on the guide vane journals by a bayonet closure configured on the guide vane journals.

2. The variable turbine geometry according to claim 1, wherein in a mounting position the guide vane journals are situated in the opening, wherein the opening is at least one of
    radial openings configured on an inner circumference of the control ring, and
    mounting openings configured on an outer circumference of the control ring, and wherein the control ring is adjusted between a first operation position and a second operation position in an adjusting direction along at least one control ring guide area.

3. The variable turbine geometry according to claim 1, wherein the control ring is configured in a circumferential groove configured on the guide vane journals, which are configured to support the control ring.

4. The variable turbine geometry according to claim 3, wherein in a mounting position the guide vane journals are situated in the opening, wherein the opening is at least one of
    radial openings configured in a first portion of the control ring, and
    mounting openings configured in a second portion of the control ring, and wherein the control ring is adjusted in an adjusting direction along at least one guide area configured on the control ring.

5. The variable turbine geometry according to claim 3, wherein a vane bearing ring accommodates a plurality of the guide vanes, and wherein the control ring operates a plurality of control levers for joint adjustment of the guide vanes by the control ring.

6. The variable turbine geometry according to claim 3, wherein the control ring is guided one of radially and axially in the circumferential groove of the guide vane journals, which is configured for supporting the control ring.

7. The variable turbine geometry according to claim 6, wherein in a first mounting position the guide vane journals are situated in at least one of:
    radial openings configured in the control ring, and
    mounting openings configured on the control ring,
and wherein the control ring is adjusted between a first operation position and a second operation position in at least one adjusting direction along at least one control ring guide area.

8. The variable turbine geometry according to claim 6, wherein a vane bearing ring accommodates a plurality of the guide vanes, and wherein the control ring operates a plurality of control levers for joint adjustment of the guide vanes by the control ring.

9. The variable turbine geometry according to claim 1, wherein the control ring has at least one of openings running radially and individual cutouts, wherein the individual cutouts serve as mounting openings, and wherein an inside circumference of the control ring is configured as at least one of a guide area and a supporting area for the control ring.

10. The variable turbine geometry according to claim 9, wherein the openings running radially are selected, such that in one mounting position the guide vane journals are situated in the openings running radially in the control ring, and wherein the control ring is adjusted between a first operation position and a second operation position in an adjusting direction along the guide area of the control ring.

11. The variable turbine geometry according to claim 9, wherein the mounting openings are selected, and where in one mounting position the guide vane journals are situated in the mounting openings of the control ring, and wherein the control ring is adjusted between a first operation position and a second operation position in an adjusting direction along the guide area of the control ring.

12. The variable turbine geometry according to claim 9, wherein a vane bearing ring accommodates a plurality of the guide vanes, and wherein the guide vane journals operate a plurality of control levers for simultaneous adjustment of the guide vanes by the control ring.

13. The variable turbine geometry according to claim 1, wherein the control ring has generally L-shaped openings, which have a mounting opening and a radial part, and one of a first circumferential part and a second widened circumferential part, the second widened circumferential part being larger than the first circumferential part.

14. The variable turbine geometry according to claim 13, wherein a vane bearing ring is configured with a plurality of the guide vanes, and wherein the guide vane journals operate a plurality of control levers for joint adjustment of the guide vanes by the control ring.

15. The variable turbine geometry according to claim 13, wherein one of the first circumferential part and the second widened circumferential part of the generally L-shaped openings is selected and forms a first guide area and a second guide area for the guide vane journals guided therein.

16. The variable turbine geometry according to claim 15, wherein a vane bearing ring accommodates a plurality of the guide vanes, and wherein at least one of the first guide area and the second guide area operate a plurality of control levers for joint adjustment of the guide vanes by rotation of the control ring.

17. The variable turbine geometry according to claim 1, wherein the control ring comprises openings that are keyholes extending in a circumferential direction, forming at least one guide area.

18. A variable turbine geometry supercharging device, comprising:
    a turbine rotor including a circumference;
    only a single control ring;
    a plurality of guide vanes;
    a plurality of guide vane journals, each guide vane journal extending from a guide vane, wherein the plurality of guide vanes are configured on the circumference of the turbine rotor and are operable by means of the single control ring,
    wherein the control ring is radially supported on the guide vane journals and axially locked by a portion of the guide vane journals extending through an opening in a surface of the control ring.

19. The variable turbine geometry according to claim 1, wherein a vane bearing ring accommodates a plurality of the guide vanes, and wherein at least one of a first guide area and a second guide area operate a plurality of control levers for simultaneous adjustment of the guide vanes by rotation of the control ring.

20. The variable turbine geometry according to claim 18, wherein in a first mounting position the guide vane journals are situated in the opening, the opening including, at least one of radial openings configured on an inner circumference of the control ring, and mounting openings configured on an outer circumference of the control ring, and wherein the control ring is adjusted between a first operation position and a second operation position in an adjusting direction along at least one control ring guide area.

\* \* \* \* \*